(12) United States Patent
Uchida

(10) Patent No.: US 10,001,956 B2
(45) Date of Patent: Jun. 19, 2018

(54) INFORMATION PROCESSING APPARATUS AND INFORMATION PROCESSING METHOD

(71) Applicant: CANON KABUSHIKI KAISHA, Tokyo (JP)

(72) Inventor: Tatsuro Uchida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/434,360

(22) Filed: Feb. 16, 2017

(65) Prior Publication Data

US 2017/0255424 A1    Sep. 7, 2017

(30) Foreign Application Priority Data

Mar. 2, 2016 (JP) ................................. 2016-040444

(51) Int. Cl.
*G06F 3/12* (2006.01)
*G06K 15/00* (2006.01)

(52) U.S. Cl.
CPC .......... *G06F 3/1225* (2013.01); *G06F 3/1204* (2013.01); *G06F 3/1209* (2013.01); *G06F 3/1284* (2013.01); *G06K 15/002* (2013.01)

(58) Field of Classification Search
CPC .... G06F 3/1204; G06F 3/1209; G06F 3/1284; G06F 3/1225; G06K 15/002
USPC ........................................................ 358/1.13
See application file for complete search history.

(56) References Cited

U.S. PATENT DOCUMENTS

| 7,619,758 | B2 | 11/2009 | Kujirai et al. |
| 9,036,190 | B2 | 5/2015 | Uchida |
| 2010/0277761 | A1* | 11/2010 | Sakura ................. G06F 3/1203 358/1.15 |
| 2012/0044534 | A1* | 2/2012 | Ichikawa ............. G06F 3/1204 358/1.15 |

FOREIGN PATENT DOCUMENTS

JP    2014-006570 A    1/2014

* cited by examiner

*Primary Examiner* — Neil R McLean
(74) *Attorney, Agent, or Firm* — Fitzpatrick, Cella, Harper & Scinto

(57) ABSTRACT

Print settings of a first print queue (DEVMODE) are converted, in part or in whole, into print settings of a format used by a second printer driver (PrintTicket), and the generated print settings of the format used by the second printer driver (PrintTicket) are used as print settings of a second print queue.

14 Claims, 16 Drawing Sheets

FIG. 8A

PRINTER DRIVER INSTALLER

SELECT PROCESSING

- ● ADD NEW PRINT QUEUE AND UPDATE EXISTING PRINTER DRIVER
- ○ ADD NEW PRINT QUEUE
- ○ UPDATE EXISTING PRINTER DRIVER

[< BACK]  [NEXT >]  [CANCEL]

FIG. 8B

PRINTER DRIVER INSTALLER

SELECT PRINTER MODEL TO BE INSTALLED

LIST OF PRINTER MODELS

Model a
Model b
Model c
Model d

[< BACK]  [NEXT >]  [CANCEL]

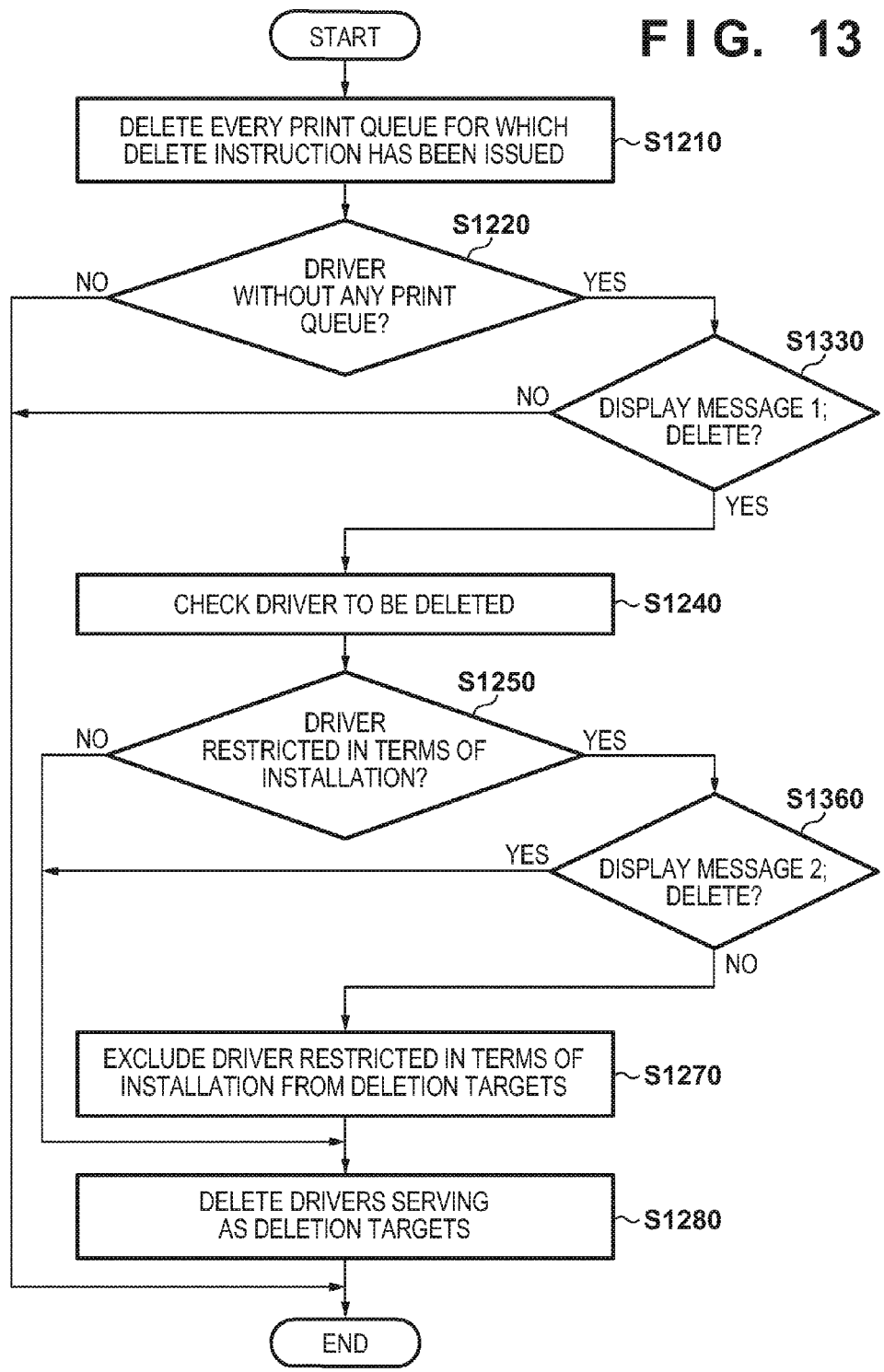

FIG. 14A

MESSAGE 1

DELETION OF PRINTER DRIVER

PRINTER DRIVER IS NO LONGER IN USE.
DO YOU WANT TO DELETE THIS PRINTER DRIVER?

[ YES ]  [ NO ]

FIG. 14B

MESSAGE 2

DELETION OF PRINTER DRIVER

DRIVER CANNOT BE NEWLY INSTALLED.
ONCE DELETED, THIS DRIVER CAN NEVER BE USED.
IT IS RECOMMENDED THAT THIS DRIVER BE LEFT UNDELETED.

DO YOU WANT TO DELETE THIS DRIVER COMPLETELY?

[ YES ]  [ NO ]

INFORMATION PROCESSING APPARATUS AND INFORMATION PROCESSING METHOD

BACKGROUND OF THE INVENTION

Field of the Invention

The present invention relates to an information processing apparatus and an information processing method, and in particular to a technique related to installation of printer driver software used to perform printing via a computer.

Description of the Related Art

Printer driver installers for installing printer drivers in computers (hereinafter, simply "installers") are used as software that enables easy installation and setting of printer drivers. Main tasks of installers include addition of new printer drivers and updating of existing printer drivers. For example, Japanese Patent Laid-Open No. 2014-6570 describes a method of handing over setting information in updating printer drivers.

Conventionally, installers hand over print settings and environmental settings under the assumption that handover is performed when a printer driver is revised, for example, when a printer driver that has already been installed is overwritten with another printer driver having the same architecture upon installation of another printer driver. In other words, they are not generated in consideration of the possibility of changes in the architectures of printer drivers. Therefore, in the case of an update that involves an architectural change, a user is required to configure, for example, complicated printer driver settings including print settings and environmental settings by him/herself when replacing a printer driver having an old architecture with a printer driver having a new architecture, even with the use of an installer.

Conventional driver update processing is based on the premise that the architecture remains the same; using this processing as-is in processing for replacing a driver having an old architecture with a driver having a new architecture creates the problem that every target driver is replaced with the driver having the new architecture.

Furthermore, operating system (hereinafter, simply "OS") venders are contemplating early integration of architectures of supported printer drivers into a new architecture, and thus advancing restrictions on installation of printer drivers with old architectures. When installation of printer drivers with old architectures is restricted especially on a new OS, it is often the case that printer drivers with old architectures can never be installed again once deleted. This makes it difficult to maintain a printing system that uses drivers with old architectures currently used by a user. There is also the problem that the user cannot make a transition to a new OS if he/she chooses not to update printer drivers to maintain the environment.

SUMMARY OF THE INVENTION

According to the present invention, for example, complicated printer driver settings including print settings and environmental settings are configured automatically, even in the case of installation of a printer driver with a new architecture to replace a printer driver with an old architecture. Furthermore, the present invention enables the use of a printer driver with a new architecture while maintaining a printing environment that uses a printer driver with an old architecture. The present invention also allows a driver with an old architecture to be maintained in an always usable state.

The present invention incorporates the following configurations.

According to the first aspect of the present invention, there is provided an information processing apparatus that is capable of using a device driver with a first architecture and a device driver with a second architecture different from the first architecture, and that has the device driver with the first architecture installed therein, the information processing apparatus comprising: a search unit configured to search for a queue to be replaced in installing the device driver with the second architecture, the queue to be replaced using the device driver with the first architecture corresponding to a peripheral device to which the device driver with the second architecture corresponds; a control unit configured to, when the queue to be replaced has been found, perform control to replace the queue to be replaced with another queue that uses the installed device driver with the second architecture; and a handover unit configured to convert setting information of the queue to be replaced into a format compatible with the device driver with the second architecture, and storing the converted setting information as setting information of the another queue.

According to the second aspect of the present invention, there is provided an information processing method in an information processing apparatus that is capable of using a device driver with a first architecture and a device driver with a second architecture different from the first architecture, and that has the device driver with the first architecture installed therein, the information processing method comprising: searching for a queue to be replaced in installing the device driver with the second architecture, the queue to be replaced using the device driver with the first architecture corresponding to a peripheral device to which the device driver with the second architecture corresponds; when the queue to be replaced has been found, performing control to replace the queue to be replaced with another queue that uses the installed device driver with the second architecture; and converting setting information of the queue to be replaced into a format compatible with the device driver with the second architecture, and storing the converted setting information as setting information of the another queue.

Further features of the present invention will become apparent from the following description of exemplary embodiments with reference to the attached drawings.

BRIEF DESCRIPTION OF THE DRAWINGS

FIGS. 8A, 8B, 8C, and 8D show examples of dialogs displayed by the installer;

FIG. 13 is another flowchart of processing for deleting a print queue and a printer driver;

FIGS. 14A and 14B show examples of messages to be displayed.

DESCRIPTION OF THE EMBODIMENTS

The following describes an embodiment of the present invention using the drawings.

[System Configuration]

Figure 1:
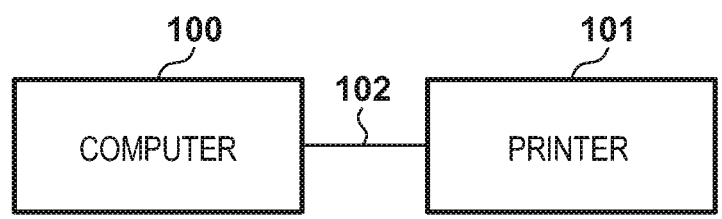
FIG. 1 is a block diagram showing a system configuration according to an embodiment.

FIG. 1 is a block diagram showing a system configuration according to the present embodiment. The system configuration according to the present embodiment will now be described using this figure. The present embodiment incorporates an information processing apparatus 100 and a printing apparatus 101 (hereinafter, they will be simply described as a computer and a printer, respectively, by way of example). It will be assumed that the computer 100 and the printer 101 are connected by a communication medium 102 that uses, for example, wired or wireless communication, either directly or indirectly via another apparatus in such a manner that they can perform bidirectional communication.

[Hardware Configurations]

Figure 2A:
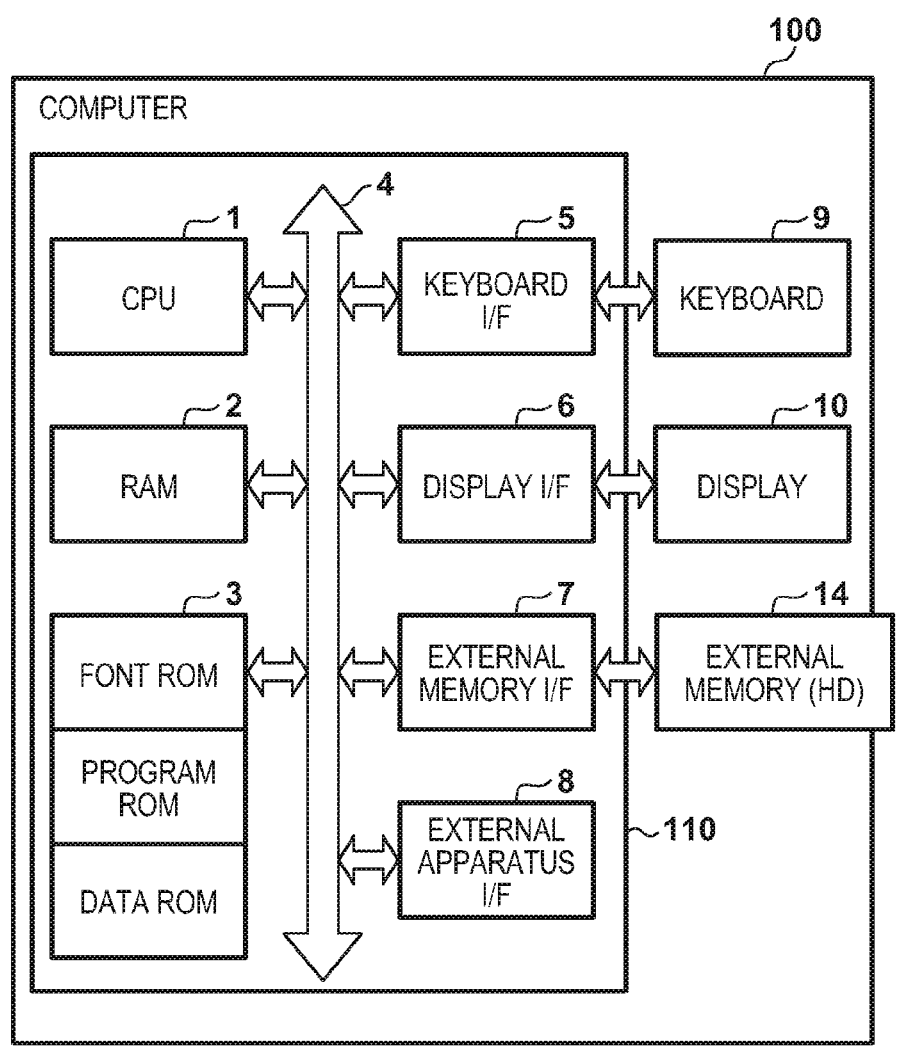
FIGS. 2A and 2B are block diagrams showing hardware configurations of a computer and a printer.

Next, hardware configurations of the computer 100 and the printer 101 incorporated in the present embodiment will be described using FIGS. 2A and 2B. FIG. 2A is a block diagram showing the hardware configuration of the computer 100. The computer 100 includes a control unit 110 and peripheral devices that can be connected thereto. The peripheral devices include, for example, a keyboard 9 that accepts input from a user, a display 10 for displaying an image showing a processing result to the user, and an external memory 14. The control unit 110 includes a keyboard interface 5, a display interface 6, and an external memory interface 7 for connection to these peripheral devices, as well as a bus 4 for device connection. The control unit 110, that is, the computer 100 is controlled by a CPU 1. The CPU 1 can load a basic input/output system (BIOS control program) stored in ROMs 3, an operating system, peripheral device drivers, and various application programs stored in the external memory 14, and the like to a RAM 2, and execute the loaded items. The control unit 110, that is, the computer 100 also includes an external apparatus I/F 8, examples of which include a USB, memory card, and wired/wireless network for communication with other information apparatuses. Note that processing handled in the present embodiment is realized as a result of loading a program stored in a program ROM 3 to the RAM 2 and executing the loaded program on the CPU 1.

Figure 2B:
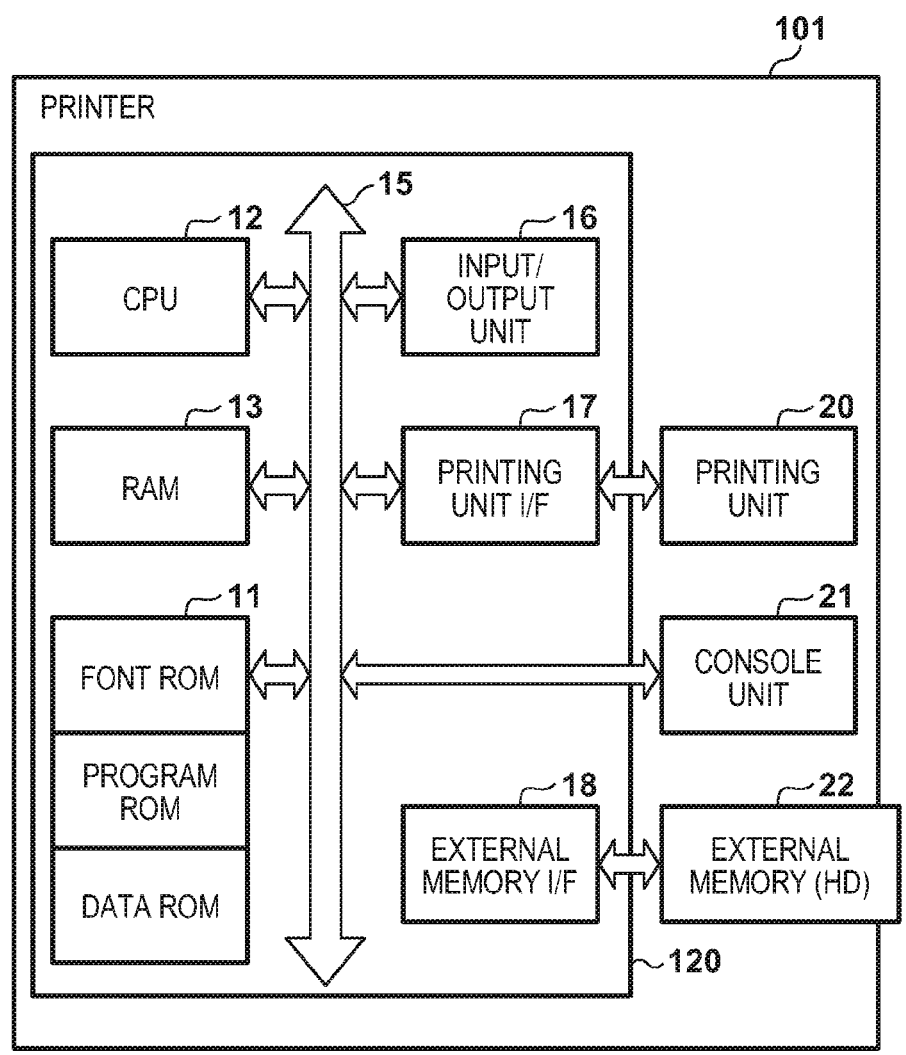

FIG. 2B is a block diagram showing the hardware configuration of the printer 101. The printer 101 includes a control unit 120 and peripheral devices that are connected thereto. The peripheral devices include, for example, a printing unit 20, a console unit 21, and an external memory 22. The control unit 120 includes a printing unit interface 17 and an external memory interface 18 for connection to these peripheral devices, as well as a bus 15 for device connection. The printer 110 is controlled by the control unit 120, and the control unit 120 is controlled by a CPU 12. The CPU 12 can load a control program stored in ROMs 11 and various programs stored in the external memory 22 to a RAM 13, and execute the loaded items. The CPU 12 performs printing by converting, for example, print data input via an input/output unit 16 into an image signal and outputting the image signal to the printing unit 20 via the printing unit interface 17 based on the operations of the control program. The conversion into the image signal may be performed by the printing unit interface 17. The CPU 12 also outputs, from the input/output unit 16, a result of processing executed in accordance with various response requests input via the input/output unit 16 based on the operations of the control program. Connecting the console unit 21 to the printer 101 enables acceptance of direct input from the user. Note that processing handled in the present embodiment is realized as a result of loading a program stored in a program ROM 11 to the RAM 13 and executing the loaded program on the CPU 12.

[Software Configuration]

Figure 3:
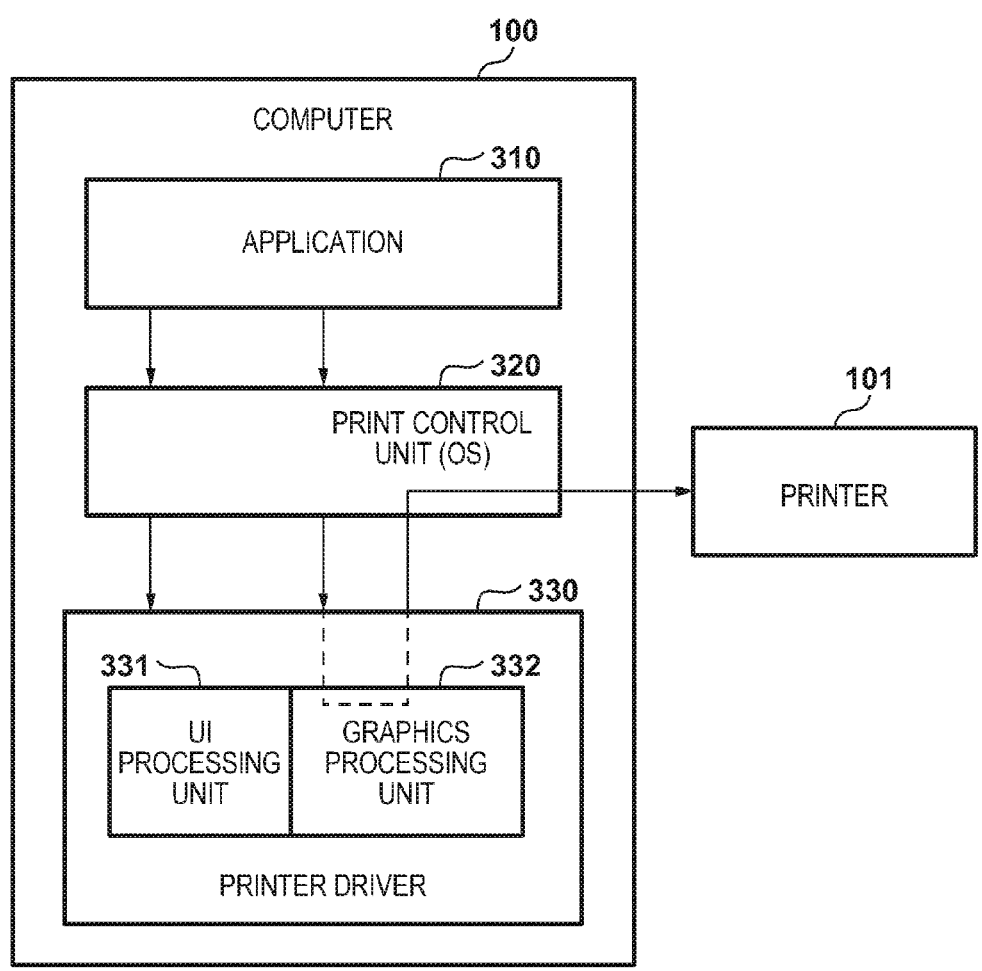
FIG. 3 is a block diagram showing a software configuration of the computer and the flow of print processing.

Next, a software configuration and print processing according to the present embodiment will be described using FIG. 3. FIG. 3 is a block diagram showing a software configuration of the computer 100 and the flow of the print processing. The computer 100 includes an application 310 that issues a print instruction, a print control unit 320 that performs control related to printing as a part of the OS, and a printer driver 330 that generates print settings and print data.

The printer driver 330 executes two types of processing: generation of print settings, and generation of print data. With regard to the processing for generating print settings, the application 310 obtains print settings generated by a UI processing unit 331 included in the printer driver 330 by calling the UI processing unit 331 via the print control unit 320. With regard to the processing for generating print data, the application 310 generates print data by calling a graphics processing unit 332 included in the printer driver 330 via the print control unit 320 using the print settings that have been obtained in advance. The graphics processing unit 332 transmits the generated print data to the printer 101 via the print control unit 320, and then the printer 101 executes actual print processing.

[Printer Drivers and Print Queues]

A description is now given of the relationships among printer drivers and print queues. A printer driver is software for causing a printer to execute print processing, and a print queue is a logical printer object linked to (that is, associated with) the printer driver. A print queue is an object that enables an OS and other applications to use a printer driver, and its settings include a name, information about sharing, a port and server serving as connection destinations, a driver to be used, print settings, device-related settings, etc. Furthermore, a print queue is used as an object that stores print data generated by a printer driver. Operations to add and delete a printer driver are "addition of a printer driver" and "deletion of a printer driver," which are distinguished from "addition of a print queue" and "deletion of a print queue" representing operations to add and delete a print queue.

For one print queue, one printer driver to be used by that print queue is always set. The same printer driver may be used by any number of print queues. Furthermore, a computer can include a printer driver to which no print queue is allocated.

Windows®, an OS developed by an American company, Microsoft Corporation, imposes a restriction whereby one computer cannot simultaneously include two or more printer drivers of the same identification name (hereinafter, simply "driver name"). With this restriction, installation of a printer driver that has the same driver name as a printer driver already installed in a computer is treated as updating of a printer driver, rather than addition of a printer driver. In the present embodiment, while a printer driver uses a name of its printer model as a driver name, it will be assumed that printer drivers supporting the same printer model have different driver names if they have different printer driver architectures.

Figure 4:
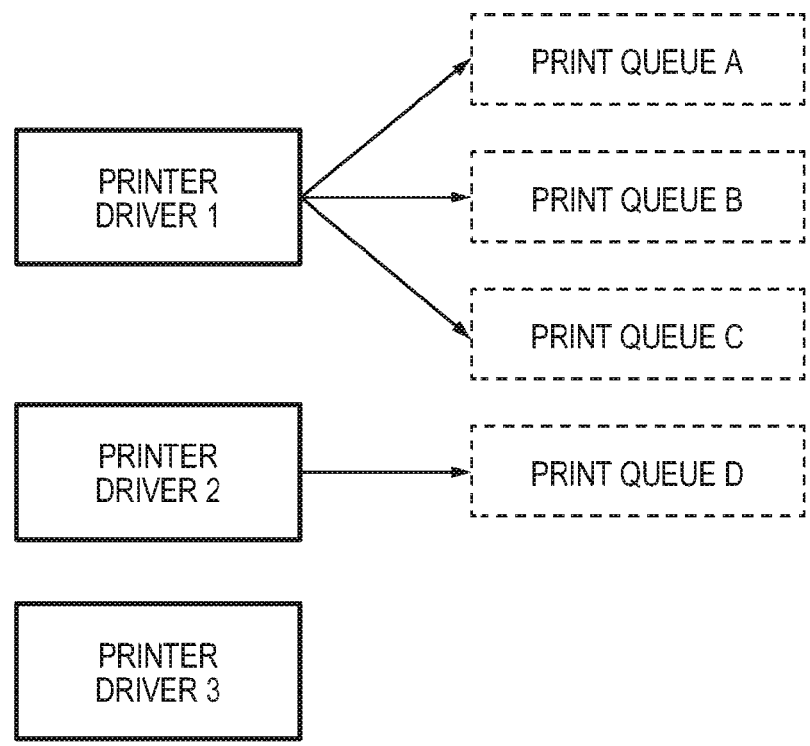
FIG. 4 is a block diagram showing the relationships among printer drivers and print queues.

FIG. 4 is a block diagram showing the relationships among printer drivers and print queues. This figure indicates that printer drivers 1, 2, and 3 are installed in a computer, print queues A, B, and C are linked to the printer driver 1, a print queue D is linked to the printer driver 2, and no print queue is linked to the printer driver 3.

[Types of Printer Driver Installation Processing]

A description is now given of the types of printer driver installation processing executed to install a printer driver with a new architecture in an environment in which printer drivers with new and old architectures coexist. To begin with, the definitions of architectures and versions (revisions) of printer drivers will be discussed. Some operating systems allow installation of a plurality of different printer drivers in correspondence with one printer. The plurality of different printer drivers corresponding to one printer include, for example, printer drivers with different architectures. For example, a printer driver generates print settings of a printer and a print job that can be processed by the printer in response to call-up of a function by an operating system. Therefore, if the format and structure of document data serving as the basis for the print settings and print job have been changed along with version upgrading of the operating system, it may become necessary to replace the printer driver with a printer driver having a different basic structure, i.e., architecture. In the present embodiment, Vx is placed before the names of drivers with various architectures for the purpose of identifying the architectures of drivers supported by an operating system. Note that x is a numeric value; one example of driver names is "V3 printer driver." A driver compliant with any architecture is continuously updated for security enhancement and the like. Note that this update does not change the architecture. Even if the entire driver is updated as a result, the architecture does not change between before and after the update; for example, provided that the architecture before the update is V1, the architecture after the update is still V1. Assume that a driver with a certain architecture is prepared under a certain operating system in correspondence with a printer conforming to the foregoing rule; in this case, information indicating an update state of the driver is referred to as a version or a revision, and ver n.m is placed after the name of the printer driver in the present embodiment. For example, a V3 printer driver of version 1.01 is noted as V3 printer driver ver 1.03. Note that in some figures including FIG. 5, a version is indicated using R to avoid confusions. Updating of a version or a revision is referred to as version upgrading, revising, or updating (update installation), and is to be distinguished from replacement installation that involves an architectural change. An architecture indicates compatibility with an operating system, whereas a version or a revision does not affect compatibility as long as version upgrading (revising) is performed appropriately. In the case that version upgrading of an operating system causes architectural changes in device drivers, the operating system often supports both new and old architectures in general. This is because supporting only the new architecture disables the use of devices that are associated only with drivers compliant with the old architectures. As a result, an environment is created in which printer drivers with new and old architectures coexist. Under an operating system that newly supports a driver with a new architecture, a driver with a new architecture may be referred to as a native driver, whereas a driver with an old architecture may be referred to as a compatible driver.

Figure 5:
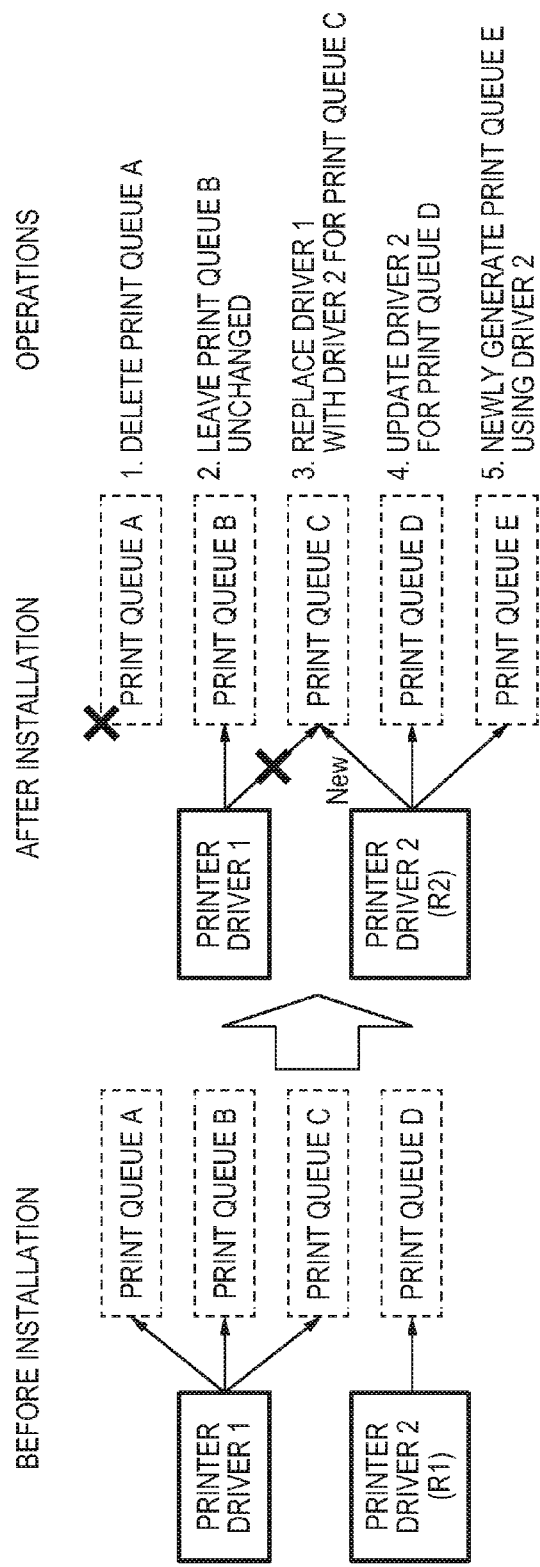
FIG. 5 shows examples of the states before and after a printer driver update and replacement.

The following describes the types of printer driver installation processing executed to install a printer driver with a new architecture in the foregoing environment. FIG. 5 shows examples of the states of printer drivers and print queues before and after a printer driver update. The types of printer driver installation processing will be described using this figure. In the following description, a printer driver 1 has an old architecture, a printer driver 2 has a new architecture, and they are both supported by a certain operating system. The printer drivers 1 and 2 will be described as printer drivers that can both perform output via the same printer 101.

FIG. 5 shows an exemplary environment in which four print queues A, B, C, and D exist before installation, of which the print queues A, B, and C use the printer driver 1 with the old architecture, whereas the print queue D uses the printer driver 2 with the new architecture. That is, the printer drivers 1 and 2 are respectively a compatible printer driver and a native printer driver that correspond to one printer. In order to update (or revise) the printer driver 2 with the new architecture from R1 to R2 in this environment, the following five operations can be performed with respect to various print queues. Note that these five operations are presented as exemplary operations, and possible operations are not limited thereto.

Operation 1: Delete the print queue A
Operation 2: Use the print queue B as-is
Operation 3: Replace the printer driver 1 with the printer driver 2 for the print queue C
Operation 4: Update the printer driver 2 from R1 to R2 for the print queue D
Operation 5: Add a print queue E for the printer driver 2

By using the operation 1 to delete the print queue A in combination with the operation 5 to add the print queue E, the printer driver 1 is replaced with the printer driver 2; in this case, print queue information is not handed over, and thus these operations are each treated as independent and discrete processing. The operation 2 to use the print queue B as-is makes the print queue B use the printer driver 1, which is different from the newly-installed printer driver 2, and thus is not affected by the driver installation. The operation 3 replaces the printer driver 1 having the old architecture with the printer driver 2 having the new architecture, and thus requires processing that is different from a conventional driver update (version upgrading) that maintains the same architecture. The details of this processing will be described later. The operation 4 of a printer driver update that maintains the same architecture, as well as the operation 5 to generate a new print queue using an installed printer driver, is conventional installation processing and thus not discussed herein in particular.

[Installer Processing]

Figure 6:
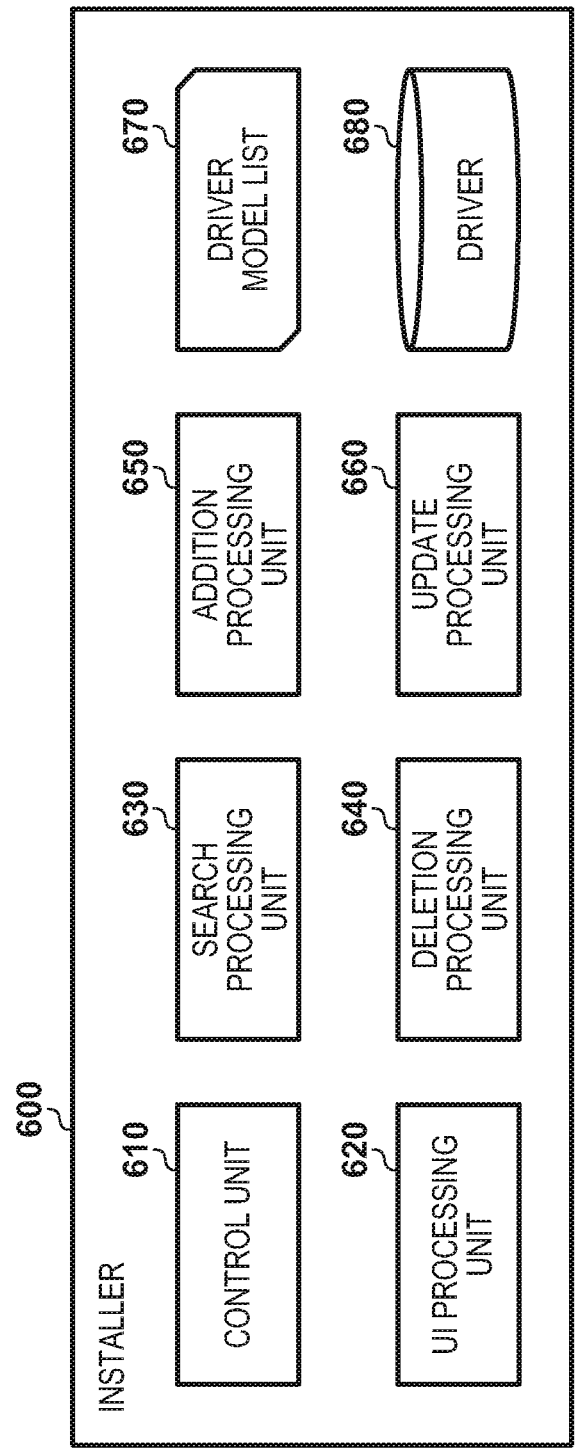
FIG. 6 is a block diagram showing a configuration of an installer according to the invention of the embodiment.

The following describes processing of an installer according to the present embodiment. FIG. 6 is a block diagram showing a configuration of the installer according to the present embodiment. An installer 600 according to the present embodiment includes a control unit 610 that controls installation processing as a whole, a UI processing unit 620 that executes UI display processing, a search processing unit 630 that searches for drivers and print queues, an addition processing unit 650 that performs addition, an update processing unit 660 that performs updating, and a deletion processing unit 640 that performs deletion. It also includes a driver model list 670 that describes a printer model of the printer driver 1 supported by a printer model of the printer driver 2, and a printer driver 680 to be installed. Note that installation covers not only new installation, but also updating of a printer driver and the like that have already been installed, and replacement installation to replace a driver with another driver having a different architecture.

The driver model list 670 describes a printer model supported by the printer driver 1 with the old architecture. If the printer driver 2 supports the printer model described in this list, it can be determined that the printer driver 2 can replace the printer driver 1 as a printer driver used by print queues. That is, in this case, this printer is compatible with both of the new and old architectures. It will be assumed that the printer driver 680 to be installed in the present embodiment is the printer driver 2 with the new architecture, i.e., the native printer driver.

Figure 7:
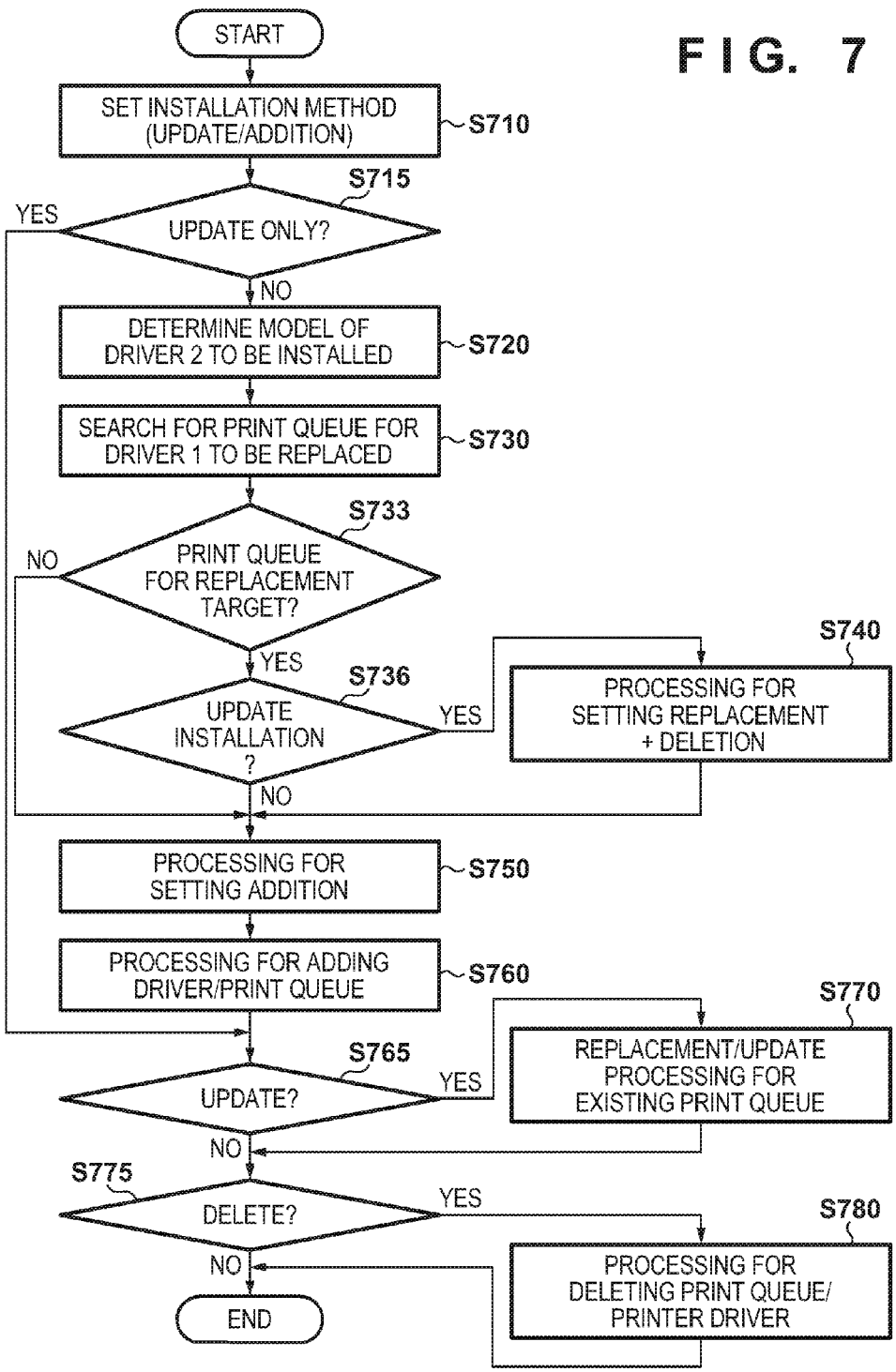
FIG. 7 is an overall flowchart showing an outline of driver installation processing.
Figure 8C:
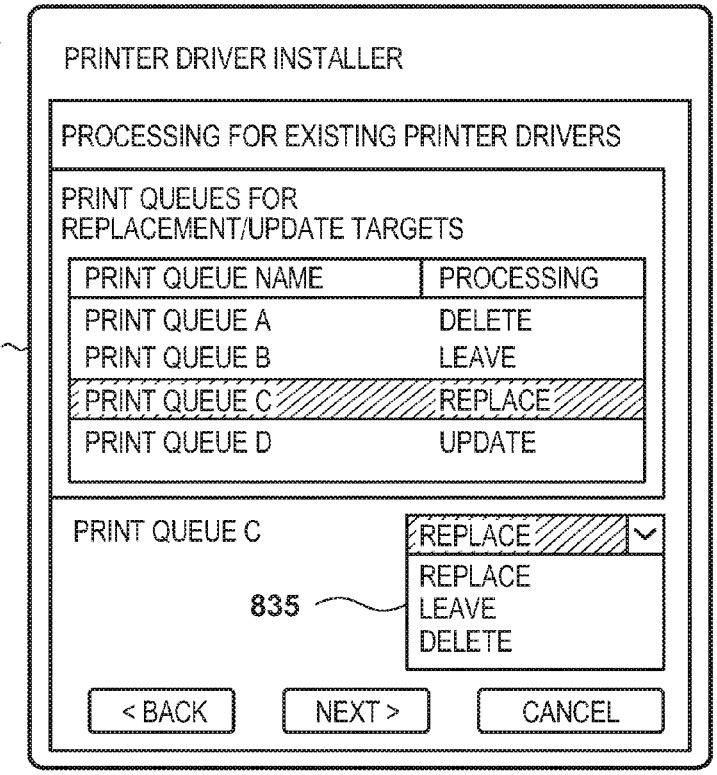
Figure 8D:
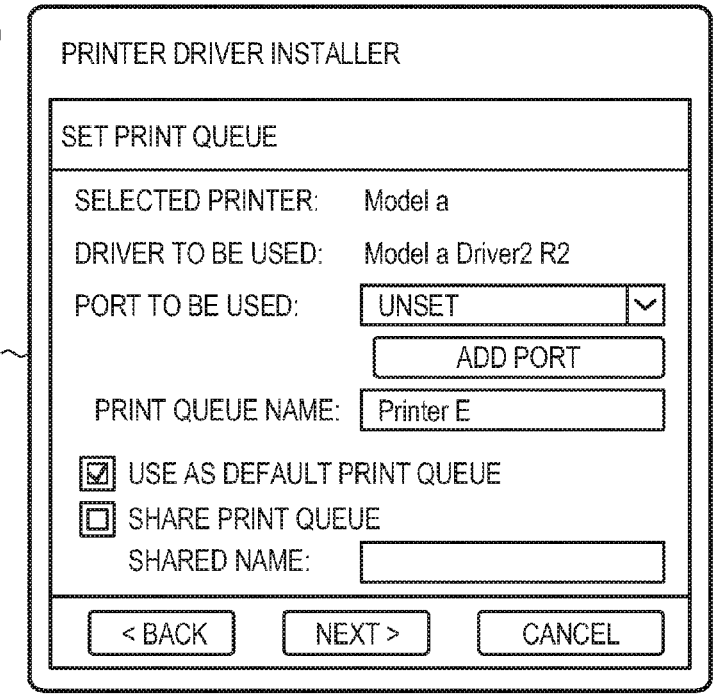

FIG. 7 is an overall flowchart showing an outline of driver installation processing, and FIGS. 8A, 8B, 8C, and 8D show examples of dialogs displayed by the installer. The outline of the installation processing will now be described using these figures. The CPU 1 executes the procedure shown in FIG. 7. In the following description, the CPU 1 is the main executer of the procedure shown in FIG. 7, and the elements shown in FIG. 6 are realized as a result of this execution. Once the user has started the installation processing, the control unit 610 displays an installation method selection screen 810 (FIG. 8A) using the UI processing unit 620 in step S710. On the processing selection screen 810, the user selects processing to be executed from among addition of a print queue and updating of a printer driver. In the example shown, one of the following three options is selected: addition and updating, addition only, and updating only. In view of FIG. 5, "addition and updating" corresponds to the operations 4 and 5, "addition only" corresponds to the operation 5, and "updating only" corresponds to the operation 4. The selected operation is confirmed by pressing the "next" button. Although updating and replacement are not distinguished from each other and are both displayed as updating on a UI, "update" that does not involve an architectural change and "replacement" that involves an architectural change are distinguished from each other in driver addition/update processing as will be described using FIG. 7.

In step S715, the selected operation is determined. The control unit 610 performs control to proceed to step S765 to execute processing for updating the existing printer driver 2 if updating only, i.e., "update existing printer driver" is designated on the processing selection screen 810, and to proceed to step S720 if other operations are designated thereon. In other words, the driver installation processing proceeds to step S720 if the selected operation involves addition of a new print queue.

In step S720, the control unit 610 displays a screen 820 for selecting a printer model supported by a printer driver to be installed (FIG. 8B) using the UI processing unit 620. Hereinafter, the printer model supported by the printer driver to be installed may be referred to as, for example, a "printer model to be installed." The screen 820 for selecting the printer model to be installed displays a list of printer models supported by the printer driver 2 to be installed. Some printer drivers may be generated to be compatible with a plurality of printer models; in view of this, the displayed list shows models compatible with the printer driver to be installed. The user selects a printer model for a print queue to be newly added from the displayed list of printer models. This selection is confirmed by pressing the "next" button.

Once the user has confirmed the printer model to be installed in step S720, the control unit 610 references the driver model list 670 and determines whether the selected printer model is supported by the printer driver 1 in step S730. If the driver model list 670 describes the selected printer model, the control unit 610 further searches for a print queue that uses the printer driver 1 supporting the selected printer model using the search processing unit 630 in the same step. Next, in step S733, the control unit 610 determines whether the search has succeeded. That is, it determines whether there is a print queue that uses the printer driver 1 supporting the selected printer model. The driver installation processing proceeds to step S736 if it is determined in step S733 that there is a print queue that uses the printer driver 1 supporting the selected printer model, and to step S750 if it is determined that there is no such print queue.

In step S736, the control unit 610 determines whether to perform printer driver update installation. The operation of updating only has already been excluded in step S715; therefore, in step S736, the control unit 610 determines whether "add new print queue and update existing printer driver" has been selected on the installation method selection screen 810 (FIG. 8A). If it is determined that "add new print queue and update existing printer driver" has been selected, the control unit 610 proceeds to step S740.

In step S740, the control unit 610 displays a screen 830 for selecting processing for existing printer drivers (FIG. 8C) using the UI processing unit 620. If a plurality of printer models have been designated on the screen 820 for selecting the printer model (FIG. 8B) for the purpose of addition, the screen 830 for selecting processing for existing printer drivers (FIG. 8C) is displayed on a model-by-model basis. On this screen, print queues that support the selected printer model and use a printer driver with a new or old architecture, i.e., the printer driver 1 or 2 are displayed as "print queues for replacement/update targets." The shown example of the screen 830 for selecting processing for existing printer drivers (FIG. 8C) pertains to a pre-installation environment shown in FIG. 5. The print queues A, B, and C use the printer drivers 1, and the following operations can be performed therefor: "replace" with the printer driver 2, "leave" as-is, and "delete." Note that leaving these print queues as-is results in the coexistence of the new and old architectures, and is also referred to as additional installation. That is, one of the following three operations can be selected for print queues that use the printer driver with the old architecture: replacement with the printer driver with the new architecture, no replacement (i.e., additional installation), and deletion. The user can make this selection for the print queues on the screen shown in FIG. 8C on a queue-by-queue basis. In the example shown in FIG. 8C, a selected instruction on an operation for the print queue C is accepted via a list box 835. Note that the print queue D uses the printer driver 2 to be installed (here, to be updated to a new revision), and a corresponding driver name is the same before and after the update despite the revision change, as mentioned earlier. Therefore, it is not possible to "leave" the print queue D as-is in the computer. In view of this, "leave" is not included among the options for instructions on operations for a print queue that uses a printer driver to be updated. Thus, only "update" and "delete" are available as instructions on operations for the print queue D. In the foregoing manner, instructions on operations for print queues for replacement/update targets are accepted in step S740. Note that an operation to update a revision of a printer driver to be used without changing its architecture is referred to as "update," and is clearly distinguished from an operation to change an architecture of a driver to be used, which is referred to as "replacement." Furthermore, an operation to install a printer driver with a new architecture while leaving a printer driver with an old architecture is referred to as "addition." The selected instruction on operation is also confirmed by pressing the "next" button.

Next, in step S750, the control unit 610 displays a screen 840 for setting a print queue to be added (FIG. 8D) using the UI processing unit 620. On this screen, for example, various settings are configured including a port and a name of a print queue for the printer model selected on the screen 820 for selecting the printer model to be installed (FIG. 8B), whether to set a corresponding printer as a default printer and a shared printer, etc. As the selected printer model and the printer driver to be installed have already been determined at this point, values that have already been determined are displayed thereas. Various settings values selected are confirmed by pressing the "next" button.

Next, in step S760, the control unit 610 executes processing for adding a printer driver and print queue in accordance with the settings input by the user on the screen 840 for setting the print queue to be added (FIG. 8D) using the addition processing unit 650. In the example shown, the printer driver 2 with the new architecture is updated from revision 1 to revision 2, and PrinterE is added as a new print queue.

Next, in step S765, the control unit 610 determines whether the user has issued an instruction for update or replacement processing with respect to a driver or a print queue. Specifically, it is determined that updating is to be performed if one of the following conditions is satisfied: "update existing printer driver" has been selected on the installation method selection screen 810; and a "replace" or "update" instruction has been issued for any print queue on the screen 830 for selecting processing for existing printer drivers. The driver installation processing proceeds to step S770 if it is determined in step S765 that one of these conditions is satisfied, that is, if an instruction for at least one of updating and replacement has been issued for a driver or a print queue. In step S770, the control unit 610 executes processing for replacing and/or updating an existing print queue in accordance with the user instruction (this is referred to as "replacement/update processing"). This replacement/update processing for a print queue in step S770 will be described later in detail.

Thereafter, the control unit 610 proceeds to step S775 and determines whether the user has issued an instruction for deleting a print queue. Specifically, this determination is made based on whether a "delete" instruction has been issued for any print queue on the screen 830 for selecting processing for existing printer drivers. If the user has made a request for deleting a print queue, the driver installation processing proceeds to step S780, and processing for deleting the print queue to be deleted is executed. This processing for deleting the print queue will also be described later in detail. Along with the deletion of the print queue, a printer driver that is no longer used by any print queue may be deleted. This will be described later with reference to FIG. 12. This concludes the processing of the installer according to the present embodiment.

[Print Queue Update Processing]

A description is now given of replacement/update processing for an existing print queue executed in step S770 of FIG. 7. First, the control unit 610 determines whether processing to be executed is "update" of the revision of a printer driver while maintaining the same architecture, or "replacement" of an old architecture with a new architecture. When "update existing printer driver" has been selected on the installation method selection screen 810, it is determined that "update" has been selected for a print queue that uses the printer driver to be installed. On the other hand, when "add new print queue and update existing printer driver" has been selected, the determination is made in accordance with an instruction on an operation issued on the screen 830 for selecting processing for existing printer drivers. Specifically, it is determined that a print queue for which an "update" instruction has been issued is to be updated. In the case of "update," the control unit 610 uses an existing technique to execute printer driver update processing and print queue update processing.

[Print Queue Replacement Processing]

Figure 9:
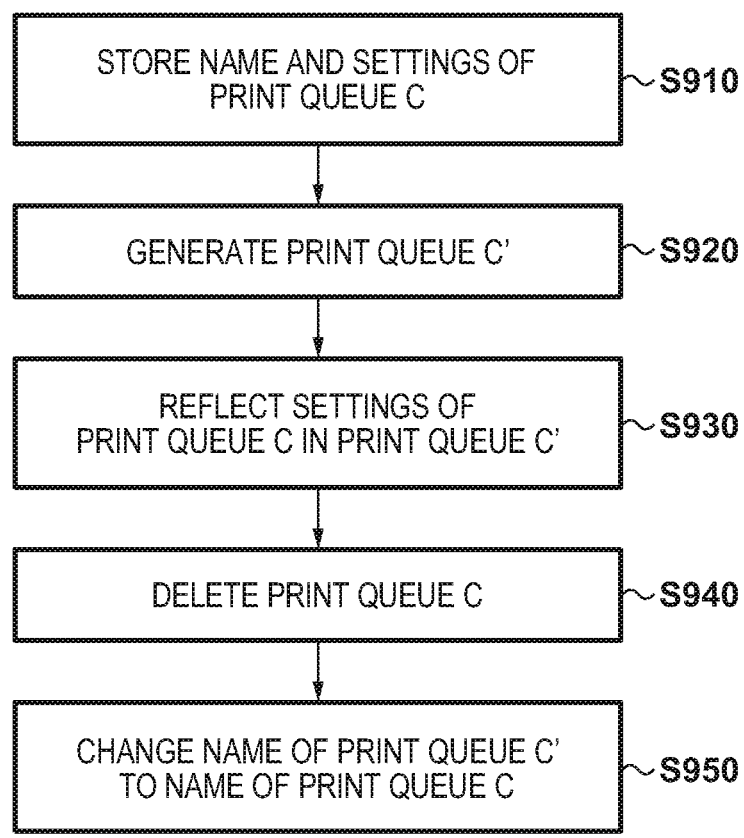
FIG. 9 is a flowchart showing an exemplary procedure of processing for replacing a printer driver.

The control unit 610 executes replacement processing with respect to a print queue for which the user issued a "replace" instruction on the screen 830 for selecting processing for existing printer drivers. FIG. 9 is a flowchart showing an exemplary procedure of replacement processing for replacing the printer driver 1 having the old architecture with the printer driver 2 having the new architecture as a printer driver to be used by the print queue C shown in FIG. 5. A description is now given of print queue replacement processing using FIG. 9. Note that this replacement involves replacement of the print queue itself.

First, in step S910, the control unit 610 stores various types of pre-replacement information related to the print queue C to be replaced using the update processing unit 660. Specifically, setting information including a name, a port serving as a connection destination, print settings, and device settings, and other information pertaining to the print queue is stored to a storage area in the computer.

Next, in step S920, the control unit 610 generates a new print queue C' to replace the print queue C. Specifically, the control unit 610 generates the new print queue C' that uses the printer driver 2 with the new architecture using the addition processing unit 650. In the case of Windows®, an OS developed by Microsoft Corporation, the print queue C' is generated and given a tentative print queue name for temporary use, because a new print queue having the same name as an existing print queue cannot be generated.

Next, in step S930, the control unit 610 reflects the setting information stored in advance in step S910 except for the print que name—i.e., the port serving as the connection destination, print settings, device settings, and other information pertaining to the print queue—in the print queue C' by handing over the same to the print queue C'. Now, handover of the print settings and device settings will be described in detail. In some cases, handover of setting information between a new architecture and an old architecture encounters a difference in the format of print settings included therein. For example, in the case of Windows®, print settings are stored in different formats: binary-based DEVMODE for the printer driver 1 with the old architecture (e.g., V3 driver), and XML-based PrintTicket for the printer driver 2 with the new architecture (e.g., V4 driver). The following description will be given based on this example.

Figure 10:
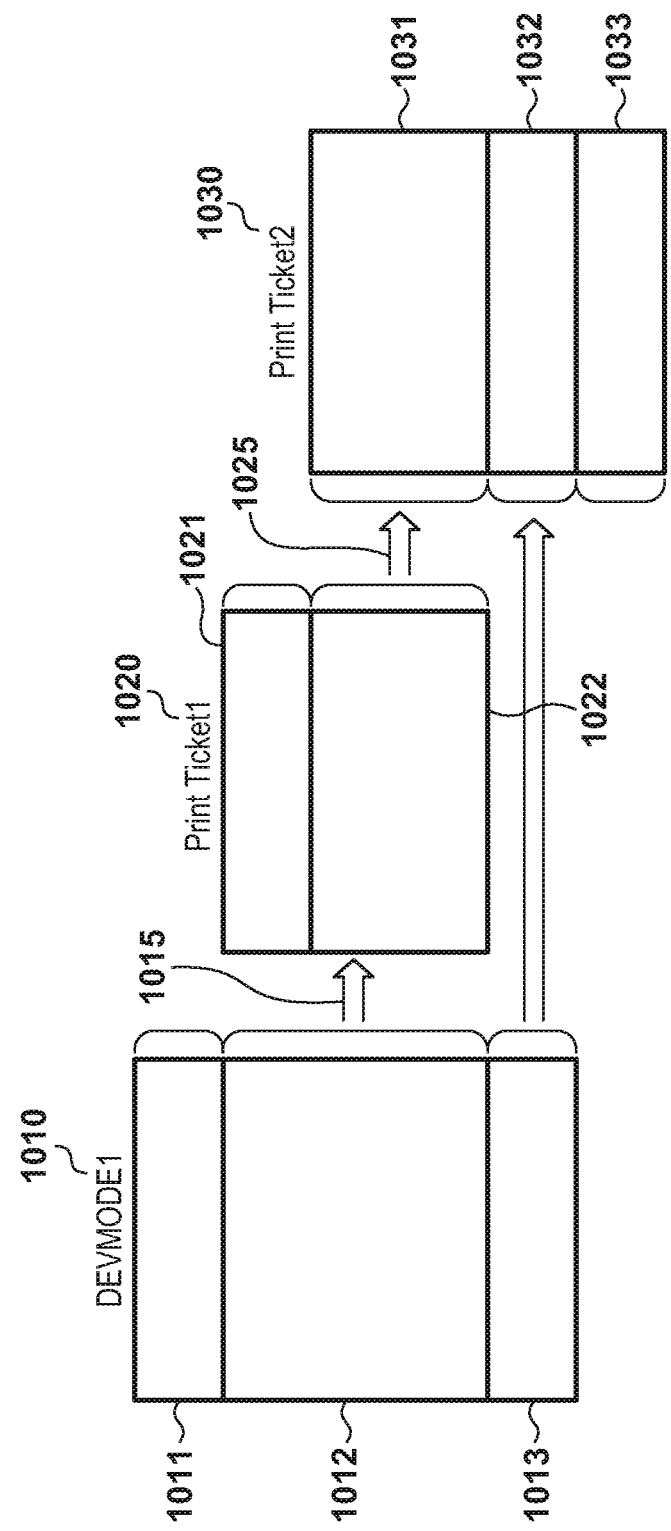
FIG. 10 is a block diagram depicting the process of replacing print settings.

FIG. 10 shows blocks depicting the process of replacing print settings, specifically, replacing DEVMODE 1010 with PrintTicket 1030. The control unit 610 can obtain the print settings DEVMODE 1010 from the print queue C using an application programming interface (API) prepared by the OS. Note that DEVMODE 1010 that can be obtained from the print queue C in the present step S930 is the print settings used by the user. Obtained DEVMODE 1010 is converted into print settings PrintTicket 1020 through DEVMODE-PrintTicket conversion processing 1015, which is provided by the printer driver 1, by way of an I/F prepared by the OS.

As settings items of DEVMODE and setting items of PrintTicket are not in one-to-one correspondence, some parts of DEVMODE 1010 (e.g., settings 1011 and 1013 of FIG. 10) may not be converted into PrintTicket 1020.

The control unit 610 can obtain the print settings PrintTicket 1030 from the print queue C' using the API prepared by the OS. Note that the print settings PrintTicket 1030 that can be obtained from the print queue C' in the present step S930 are default print settings. The control unit 610 reflects a setting item 1022 shared by PrintTicket 1020 converted from DEVMODE 1010 and default PrintTicket 1030 in a corresponding part 1031 of PrintTicket 1030 (processing 1025). The foregoing processing enables generation of PrintTicket 1030 that partially includes the print settings 1031 used by the user. This setting item 1022 shared by PrintTicket 1020 and PrintTicket 1030 serves as basic shared settings of the print settings. Therefore, by executing the foregoing processing, basic print settings including a sheet size, a printing orientation, single-sided or double-sided printing, and color or monochrome printing are handed over from DEVMODE 1010 to PrintTicket 1030.

As DEVMODE and PrintTicket are not in one-to-one correspondence in terms of setting items and the like, some parts of PrintTicket 1030 (settings 1032 and 1033 of FIG. 10) are not derived from the print settings DEVMODE 1010. To mitigate the effect of this phenomenon, the update processing unit 660 that can recognize the identicalness of the meanings carried by the settings 1013 of DVMODE 1010 and the settings 1032 of PrintTicket 1030 is provided, although dependent on a printer driver. The update processing unit 660 recognizes the structures of DEVMODE 1010 and PrintTicket 1030, and can hand over detailed settings from DEVMODE 1010 to PrintTicket 1030. This leads to an increase in the percentage of setting items that can be handed over in replacing a printer driver to be used.

Next, handover of device settings will be described. Device settings are printer driver settings, and refer to configuration information of feed options (e.g., cassettes) attached to a printing device and discharge options (e.g., finisher), rather than print settings related to print documents. Such device configuration information can be obtained by searching for a port serving as a connection destination and communicating with the device at the time of, for example, driver installation. Many printer drivers support obtainment of such configuration information. However, depending on how a printer driver is operated, various option configurations of the device may be manually set without obtaining configuration information.

Figure 11:
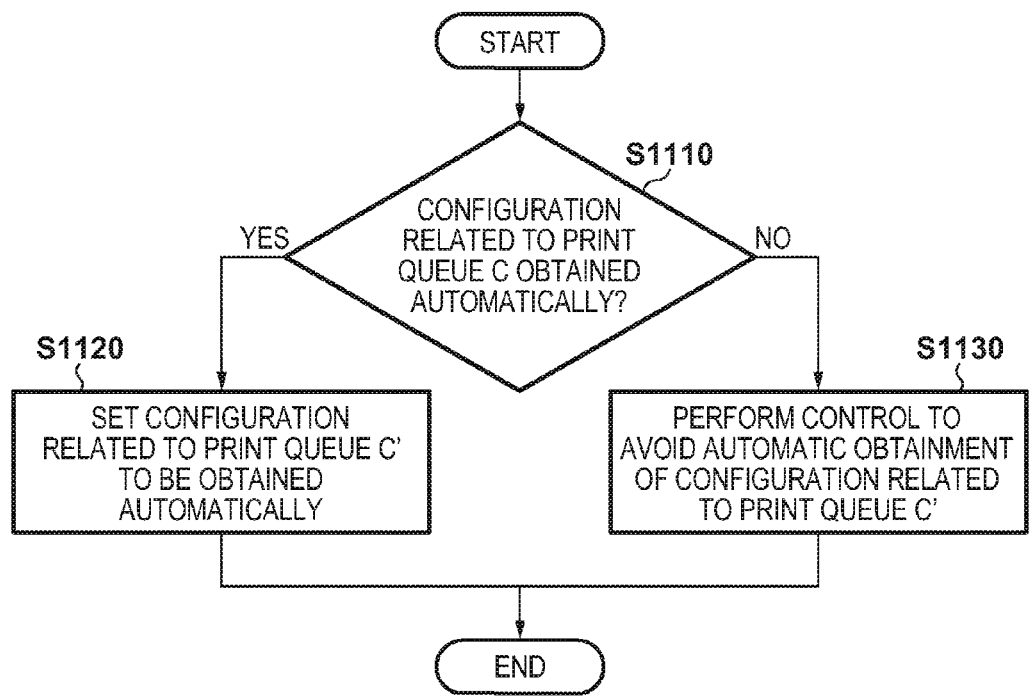
FIG. 11 is a flowchart of processing for handing over device settings.

FIG. 11 is a flowchart of processing for handing over device settings. A description is now given of the processing for handing over device settings using this figure. As the pre-replacement print queue C and the post-replacement print queue C' use different printer drivers, data indicating device settings differs between the print queues C and C'. In view of this, the control unit 610 determines whether device settings of the pre-replacement print queue C have been obtained automatically through obtainment of configuration information, or obtained through some sort of manual settings (step S1110). If it is determined that the device settings have been obtained automatically, device settings of the print queue C' are also obtained automatically from a printer using a configuration information obtainment function (step S1120). If the device settings have been obtained through manual settings, control is performed to manually obtain device settings of the print queue C' without automatic obtainment (step S1130). To this end, for example, it is desirable to add a mark for identifying an automatically obtained state to device settings that have been obtained automatically. Similarly to the print settings described earlier, by generating the update processing unit 660 dependent on a printer driver, data structures of device settings of the print queues C and C' can be recognized, and device settings equivalent to device settings of the print queue C can be generated with respect to the print queue C', even if the device settings of the print queue C have been obtained through manual settings.

The description of FIG. 9 resumes from here. Previous step S930 executed processing for handing over the settings from the print queue C to the print queue C', except for the print queue name. As the print queue C will no longer be used, the control unit 610 deletes the print queue C using the deletion processing unit 640 (step S940).

Finally, the control unit 610 executes processing for changing the print queue name of the print queue C' to the name that was used for the print queue C (step S950). This concludes the replacement of the printer driver used by the print queue (in practice, the replacement of the print queue).

[Print Queue Deletion Processing]

Figure 12:
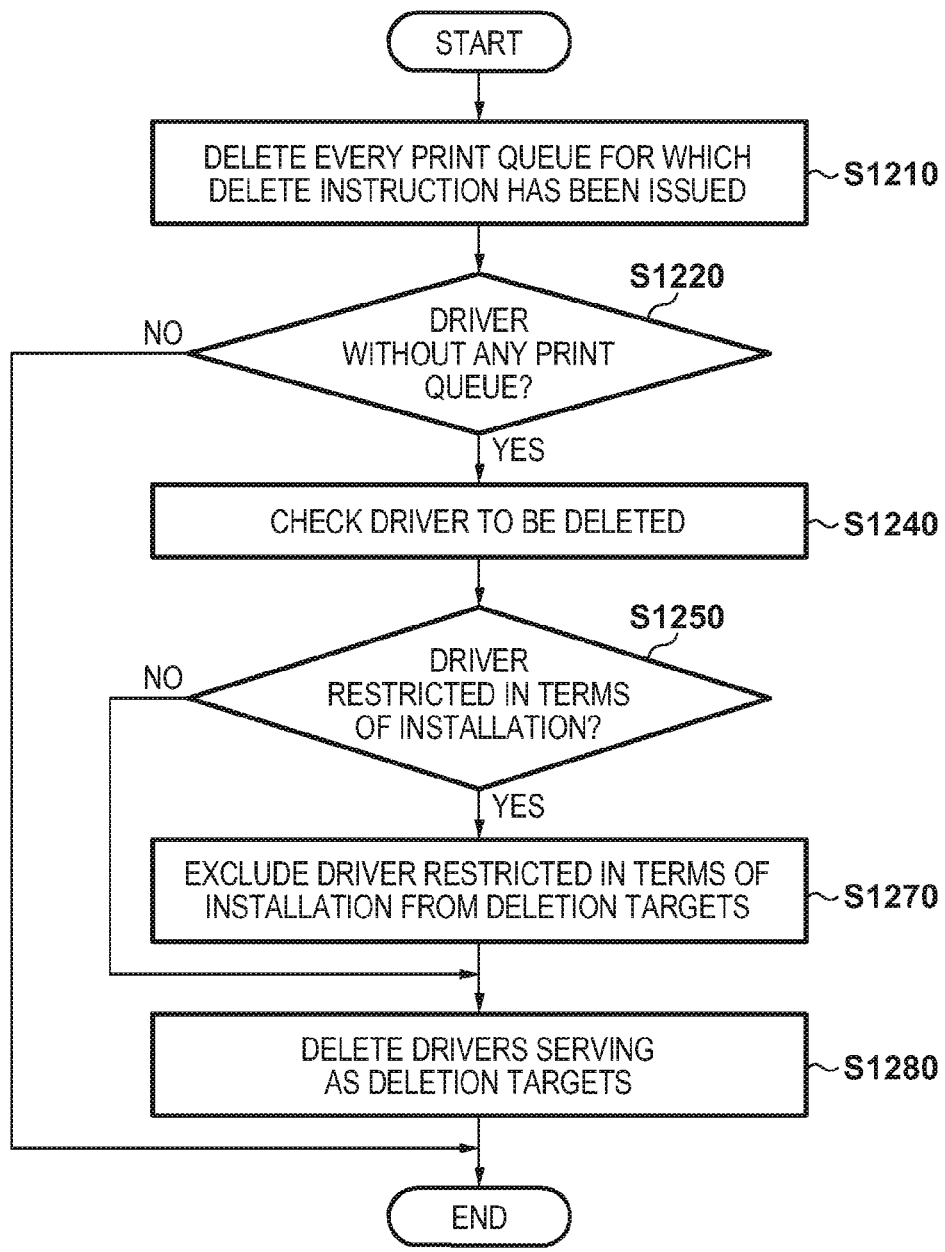
FIG. 12 is a flowchart of processing for deleting a print queue and a printer driver.

A description is now given of processing for deleting a print queue and a printer driver executed in step S780 of FIG. 7. FIG. 12 is a flowchart of the processing for deleting a print queue and a printer driver according to the present embodiment. When a "delete" instruction has been issued for any print queue on the screen 830 for selecting processing for existing printer drivers, the control unit 610 deletes the print queue for which the delete instruction has been issued using the deletion processing unit 640 (step S1210).

Next, using the search processing unit 630, the control unit 610 searches for another print queue that uses a printer driver that was used by the print queue deleted in step S1210 (step S1220). If such a print queue is found, other processing need not be executed in particular, and thus the present processing is ended.

If the printer driver that was used by the deleted print queue no longer has any print queue allocated thereto as a result of the deletion of the print queue, this printer driver is normally deleted from the computer. Deleting unnecessary printer drivers from the computer is expected to achieve advantageous effects, including a reduction in a storage area used by the computer and in the cost related to management of printer drivers.

However, as stated earlier, when installation of printer drivers with old architectures is restricted, printer drivers with old architectures can never be installed again once deleted. Although in this case, generation of print queues that use printer drivers with old architectures is not restricted. Therefore, leaving printer drivers with old architectures in the computer enables generation of print queues that use printer drivers with old architectures, even when the foregoing restriction has been imposed.

To this end, using the search processing unit 630, the control unit 610 checks whether the printer driver that was used by the print queue deleted in step S1210 is restricted in terms of installation (step S1240). If it is determined in step S1250 that the printer driver is restricted in terms of installation, this printer driver is excluded from deletion targets (step S1270). Finally, the control unit 610 deletes printer drivers treated as deletion targets using the deletion processing unit 640, and ends the present processing (step S1280). Note that in step S1240, whether the printer driver has an old architecture or a new architecture can be determined by referencing, for example, version information of the printer driver.

In the print queue deletion processing that has been exemplarily described thus far, printer driver deletion processing is executed without confirming the user's intention in particular. However, depending on the operation of the user, there may be cases in which a printer driver having no print queue allocated thereto comes into existence only temporarily, and the user quickly generates a print queue using this printer driver. Furthermore, because printer drivers that are restricted in terms of installation are not used, there may be cases in which all unnecessary printer drivers can be deleted. Considering a variety of operational environments including the foregoing cases, it may be necessary to incorporate, for example, an operation to leave printer drivers undeleted even if they become unnecessary, and an operation to delete printer drivers that are restricted in terms of installation. In view of this, for example, a user interface that enables the user to designate whether to delete printer drivers that are restricted in terms of installation may be displayed immediately before step S1270. If an input instruction indicates that the printer drivers are to be left undeleted, step S1270 may be executed; if the input instruction indicates to the contrary, step S1270 may be skipped.

FIG. 13 is a flowchart that takes the foregoing operations into consideration, and is realized by adding processing for confirming whether to delete a printer driver with the user to the flowchart of FIG. 12. FIGS. 14A and 14B show examples of messages to be displayed. The following describes the differences from the flowchart of FIG. 12 with reference to FIGS. 13, 14A, and 14B.

If it is determined in step S1220 that there is a printer driver having no print queue allocated thereto, the control unit 610 displays a message 1 shown in FIG. 14A using the UI processing unit 620 (step S1330). If the user does not issue an instruction for deleting the printer driver by selecting "NO" in response to an inquiry in the message 1, the present processing is ended because there is no need to execute the remainder thereof related to deletion of the printer driver. If the user selects "YES," the present processing proceeds to step S1240 to check whether the printer driver is restricted in terms of installation.

Next, if the control unit 610 determines in step S1250 that the printer driver is restricted in terms of installation, it displays a message 2 shown in FIG. 14B (step S1360). If the user does not issue an instruction for deleting the printer driver by selecting "NO" in response to an inquiry in the message 2, the present processing proceeds to step S1270 to exclude the printer driver from deletion targets.

Thus far, the procedure for updating an existing printer driver with a new architecture to a new revision has been described. It should be mentioned that the foregoing embodiment is applicable also to a case in which a new printer driver with a new architecture is additionally installed in a state where there is no existing printer driver. In this case, there is no printer driver of an old revision, and there is no print queue that uses such a printer driver. Therefore, on the user interface 830 shown in FIG. 8C, "update" cannot be selected for any print queue. Except for this, the present case conforms to the above-described example.

With the above-described configurations and procedures, the invention according to the present embodiment achieves the following advantageous effects when installing a printer driver with a new architecture under an operating system that supports printer drivers with an old architecture and printer drivers with a new architecture.

1. Complicated setting information including print settings and environmental settings can be automatically handed over, at least partially, from a printer driver with an old architecture to a printer driver with a new architecture.

2. A print queue that uses a printer driver with an old architecture can be left in accordance with a user selection. Furthermore, a printer driver with an old architecture can be replaced with a printer driver with a new architecture as a printer driver used by a print queue in accordance with a user selection. Note that a print queue corresponds to a selectable printer, and can be called a logical printer, for example.

3. A printer driver with an old architecture can be left undeleted in accordance with a user selection, even if every print queue that uses this printer driver has been deleted. As a result, there is no reason to hesitate to update a printer driver, thereby achieving an advantageous effect of promoting a transition to a new architecture.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-040444, filed Mar. 2, 2016, which is hereby incorporated by reference herein in its entirety.

What is claimed is:

1. An information processing apparatus that is capable of using a device driver with a first architecture and a device driver with a second architecture different from the first architecture, and that has the device driver with the first architecture installed therein, the information processing apparatus comprising:

a processor and a memory storing computer executable code, wherein the processor executes the code to perform:

searching for a queue to be replaced in installing the device driver with the second architecture, the queue to be replaced using the device driver with the first architecture corresponding to a peripheral device to which the device driver with the second architecture corresponds;

performing control to, when the queue to be replaced has been found, replace the queue to be replaced with another queue that uses the installed device driver with the second architecture; and convert setting information of the queue to be replaced into a format compatible with the device driver with the second architecture, and storing the converted setting information as setting information of the another queue.

2. The information processing apparatus according to claim 1, further comprising a first user interface that enables a user to select one of replacement processing, leaving processing, and deletion processing as processing to be applied to queues that use the device driver with the first architecture corresponding to the peripheral device to which the device driver with the second architecture corresponds on a queue-by-queue basis, the replacement processing replacing the queues that use the device driver with the first architecture with a queue that uses the device driver with the second architecture, the leaving processing leaving the queues that use the device driver with the first architecture as-is, and the deletion processing deleting the queues that use the device driver with the first architecture, wherein the searching treats a queue for which the replacement processing has been selected on the first user interface as the queue to be replaced.

3. The information processing apparatus according to claim 2, wherein a queue for which the leaving processing has been selected on the first user interface is left unchanged.

4. The information processing apparatus according to claim 2, wherein a queue for which the deletion processing has been selected on the first user interface is deleted.

5. The information processing apparatus according to claim 4, wherein a device driver that is no longer used by any queue as a result of the replacement processing or the deletion processing is treated as a deletion target.

6. The information processing apparatus according to claim 5, wherein the device driver that is no longer used by any queue as a result of the replacement processing or the deletion processing is excluded from the deletion target when the device driver is not allowed to be newly installed in the information processing apparatus.

7. The information processing apparatus according to claim 5, wherein a device driver treated as the deletion target is deleted.

8. The information processing apparatus according to claim 2, further comprising a second user interface that, in installing the device driver with the second architecture, enables the user to select one of addition processing for adding a new queue, update processing for updating an existing device driver, and combination processing for adding a new queue and updating an existing device driver, wherein when the combination processing has been selected on the second user interface, the first user interface accepts a selection thereon.

9. The information processing apparatus according to claim 2, wherein the queue for which the replacement processing has been selected on the first user interface is replaced by generating a new queue having the same name thereas and storing setting information of the queue for which the replacement processing has been selected as setting information of the new queue, with use of the device driver with the second architecture along with the installation of the device driver with the second architecture.

10. The information processing apparatus according to claim 9, wherein the device driver converts at least a part of print settings included in the setting information of the queue for which the replacement processing has been selected from a format compatible with the first architecture into a format compatible with the second architecture, and stores a result of the conversion as the setting information of the new queue.

11. The information processing apparatus according to claim 10, wherein the format compatible with the first architecture is DEVMODE of Windows, and the format compatible with the second architecture is PrintTicket.

12. The information processing apparatus according to claim 9, wherein at least a part of device settings included in the setting information of the new queue is obtained from a peripheral device controlled by the device driver with the second architecture.

13. An information processing method in an information processing apparatus that is capable of using a device driver with a first architecture and a device driver with a second architecture different from the first architecture, and that has the device driver with the first architecture installed therein, the information processing method comprising:

searching for a queue to be replaced in installing the device driver with the second architecture, the queue to be replaced using the device driver with the first architecture corresponding to a peripheral device to which the device driver with the second architecture corresponds;

when the queue to be replaced has been found, performing control to replace the queue to be replaced with another queue that uses the installed device driver with the second architecture; and converting setting information of the queue to be replaced into a format compatible with the device driver with the second architecture, and storing the converted setting information as setting information of the another queue.

14. A non-transitory computer-readable medium storing a program therein for causing a computer to perform a method, wherein the computer is capable of using a device driver with a first architecture and a device driver with a second architecture different from the first architecture, and that has the device driver with the first architecture installed therein, the method comprising:

searching for a queue to be replaced in installing the device driver with the second architecture, the queue to be replaced using the device driver with the first architecture corresponding to a peripheral device to which the device driver with the second architecture corresponds;

when the queue to be replaced has been found, performing control to replace the queue to be replaced with another queue that uses the installed device driver with the second architecture; and converting setting information of the queue to be replaced into a format compatible with the device driver with the second architecture, and storing the converted setting information as setting information of the another queue.

* * * * *